US011878653B2

(12) United States Patent
Jin

(10) Patent No.: US 11,878,653 B2
(45) Date of Patent: Jan. 23, 2024

(54) AUTHENTICATION DEVICE AND VEHICLE HAVING THE SAME

(71) Applicants: Hyundai Motor Company, Seoul (KR); Kia Corporation, Seoul (KR)

(72) Inventor: Dae Sung Jin, Daejeon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/838,370

(22) Filed: Jun. 13, 2022

(65) Prior Publication Data

US 2023/0019720 A1 Jan. 19, 2023

(30) Foreign Application Priority Data

Jul. 14, 2021 (KR) ........................ 10-2021-0091903

(51) Int. Cl.
  *B60R 25/25* (2013.01)
  *B60R 25/30* (2013.01)
  *G06F 21/32* (2013.01)
  *G06V 40/16* (2022.01)
  *G07C 9/00* (2020.01)
  *H04B 17/318* (2015.01)
  (Continued)

(52) U.S. Cl.
  CPC .............. *B60R 25/25* (2013.01); *B60R 25/01* (2013.01); *B60R 25/245* (2013.01); *B60R 25/305* (2013.01); *G06F 21/32* (2013.01); *G06V 40/172* (2022.01); *G07C 9/00309* (2013.01); *H04B 17/318* (2015.01); *G07C 2009/00634* (2013.01); *G07C 2009/00769* (2013.01); *G07C 2209/62* (2013.01); *G07C 2209/63* (2013.01)

(58) Field of Classification Search
  CPC .... G06V 40/172; B60R 25/01; B60R 25/245; B60R 25/305; B60R 25/25; G06F 21/32; G07C 9/00309; G07C 2009/00634; G07C 2009/00769; G07C 2209/63; G07C 2209/62; H04B 17/318
  See application file for complete search history.

(56) References Cited

U.S. PATENT DOCUMENTS

2012/0257061 A1\* 10/2012 Edwards ................ G08B 13/00
  348/E7.085
2019/0103027 A1\* 4/2019 Wheeler ................ B60K 37/06
  (Continued)

*Primary Examiner* — Thomas D Alunkal
(74) *Attorney, Agent, or Firm* — Fox Rothschild LLP

(57) ABSTRACT

A vehicle including a locking member configured to lock and unlock a door of the vehicle, a manipulation member provided on a handle of the door, a camera configured to obtain an image, a communicator configured to communicate with an external device, and a controller including a facial recognition processor configured to recognize a face based on image information obtained by the camera, and an authentication processor configured to perform a user authentication based on the face information, the controller being configured to obtain distance information of the external device based on a signal received by the communicator, transmit a booting instruction to the facial recognition processor based on the distance information, transmit a facial recognition instruction to the facial recognition processor based on the distance information after the booting is completed, and control operation of the locking member based on user authentication information and a manipulation signal.

16 Claims, 7 Drawing Sheets

(51) Int. Cl.
  *B60R 25/24* (2013.01)
  *B60R 25/01* (2013.01)

(56) References Cited

U.S. PATENT DOCUMENTS

| | | | |
|---|---|---|---|
| 2019/0222756 A1* | 7/2019 | Moloney | G06V 10/82 |
| 2021/0009080 A1* | 1/2021 | Hu | G06V 40/40 |
| 2021/0309181 A1* | 10/2021 | Kale | G06V 40/172 |
| 2022/0219643 A1* | 7/2022 | Hanson | G06V 40/172 |
| 2023/0029683 A1* | 2/2023 | Li | H04W 4/40 |

* cited by examiner

AUTHENTICATION DEVICE AND VEHICLE HAVING THE SAME

CROSS-REFERENCE TO RELATED APPLICATION

This application is based on and claims priority under 35 U.S.C. § 119(a) to Korean Patent Application No. 10-2021-0091903, filed on Jul. 14, 2021 in the Korean Intellectual Property Office, the disclosure of which is incorporated herein by reference in its entirety.

BACKGROUND

(a) Technical Field

The disclosure relates to an authentication device for authenticating a user and a vehicle having the same.

(b) Description of the Related Art

A key or a remote control device can unlock or lock a door of a door as well as turn the vehicle on. In other words, as long as a user is carrying a remote control device, a driver may open and close the doors and trunk of the vehicle, as well as turn on the vehicle.

Additionally, when a remote control device is in close proximity to the vehicle, the remote control device allows a driver to automatically unlock a door of a vehicle, as well as start the vehicle, through two-way communication with the vehicle without any manual operation.

Conventionally, if a driver puts a remote control device inside a vehicle and gets out of the vehicle, the items inside the vehicle may be stolen or the vehicle may be stolen by others.

Accordingly, in recent years, technologies for controlling a vehicle (door opening/closing, ignition, etc.) after performing a user authentication in a state in which communication with a remote control device have been required.

SUMMARY

An aspect of the disclosure is to provide an authentication device capable of controlling a booting of a facial recognition processor in response to approaching of a user or an external device such as a remote key, and controlling power-off of the facial recognition processor in response to leaving of the user, and a vehicle having the same.

Another aspect of the disclosure is to provide an authentication device capable of entering a facial recognition mode after recognizing a user approach, performing a user authentication through the facial recognition, and controlling door locking/unlocking or output of alarm information in response to the result of user authentication, and a vehicle having the same.

Additional aspects of the disclosure will be set forth in part in the description which follows and, in part, will be obvious from the description, or may be learned by practice of the disclosure.

In accordance with an aspect of the disclosure, an authentication device includes a facial recognition processor configured to recognize a face from image information obtained by a camera; a communication module configured to communicate with an external device; and an authentication processor configured to obtain distance information with the external device based on a received signal strength of a signal received by the communication module, transmit a booting instruction to the facial recognition processor based on the obtained distance information, transmit a facial recognition instruction to the facial recognition processor based on the obtained distance information after the booting of the facial recognition processor is completed, and perform a user authentication based on face information transmitted from the facial recognition processor.

The authentication processor may be configured to determine whether a distance with the external device is less than or equal to a first reference distance based on the obtained distance information; transmit the booting instruction to the facial recognition processor in response to determining that the distance with the external device is less than or equal to the first reference distance; and transmit a power-off instruction to the facial recognition processor in response to determining that the distance with the external device exceeds the first reference distance; and wherein the facial recognition processor is configured to perform a wake-up mode in response to reception of the booting instruction, and perform a sleep mode in response to reception of the power-off instruction.

The authentication processor may be configured to determine whether the facial recognition processor is switched to the sleep mode after transmitting the power-off instruction to the facial recognition processor, and control output of failure information in response to determining that the facial recognition processor is not switched to the sleep mode.

The authentication processor may be configured to transmit the facial recognition instruction to the facial recognition processor in response to determining that the distance with the external device is less than or equal to a second reference distance based on the obtained distance information after the booting of the facial recognition processor is completed, and control the facial recognition processor to a wake-up mode in response to determining that the distance with the external device exceeds the second reference distance.

The communication module may be configured to perform at least one of Bluetooth communication (BLU), ultra-wideband communication (UWB), Near Field Communication (NFC), low-frequency communication, and high-frequency communication.

The authentication processor may be configured to transmit authentication success information or authentication failure information for the user authentication to the body processor, and the body processor is configured to control locking and unlocking of a door of the vehicle based on the authentication success information or the authentication failure information.

The authentication processor may be configured to determine whether a predetermined time has elapsed from a time when the facial recognition processor wakes up, and transmit a power-off instruction to the facial recognition processor if the face information is not received from the facial recognition processor after the predetermined time has elapsed.

In accordance with another aspect of the disclosure, a vehicle includes a locking member configured to lock and unlock a door of the vehicle; a manipulation member provided on a handle of the door; a camera configured to obtain an image around the door; a communicator configured to communicate with an external device; and a controller including a facial recognition processor configured to recognize a face based on image information obtained by the camera, and an authentication processor configured to perform a user authentication based on face information recognized by the facial recognition processor; wherein the controller is configured to obtain distance information with the external device based on a received signal strength of a signal received by the communicator, transmit a booting instruction to the facial recognition processor based on the obtained distance information, transmit a facial recognition instruction to the facial recognition processor based on the obtained distance information after the booting of the facial recognition processor is completed, and control operation of the locking member based on user authentication information of the authentication processor and a manipulation signal of the manipulation member.

The controller may be configured to determine whether a distance with the external device is less than or equal to a first reference distance based on the obtained distance information; transmit the booting instruction to the facial recognition processor in response to determining that the distance with the external device is less than or equal to the first reference distance; and transmit a power-off instruction to the facial recognition processor in response to determining that the distance with the external device exceeds the first reference distance; and wherein the facial recognition processor is configured to perform a wake-up mode in response to reception of the booting instruction, and perform a sleep mode in response to reception of the power-off instruction.

The vehicle may further include at least one of a display and a sound outputter, wherein the controller is configured to determine whether the facial recognition processor is switched to the sleep mode after transmitting the power-off instruction to the facial recognition processor, and control output of failure information through at least one of the display and the sound outputter in response to determining that the facial recognition processor is not switched to the sleep mode.

The controller may be configured to transmit the facial recognition instruction to the facial recognition processor in response to determining that the distance with the external device is less than or equal to a second reference distance based on the obtained distance information after the booting of the facial recognition processor is completed, and control the facial recognition processor to a wake-up mode in response to determining that the distance with the external device exceeds the second reference distance.

The external device may include a terminal, and the communicator may include a first communication module configured to communicate with the terminal, wherein the first communication module is configured to perform at least one of Bluetooth communication (BLU), ultra-wideband communication (UWB), Near Field Communication (NFC), low-frequency communication, and high-frequency communication.

The external device may include a remote controller, and the communicator may include a second communication module configured to communicate with the remote controller, and a plurality of antennas.

The external device may include at least one of a remote controller and a terminal, the communicator is configured to perform at least one of BLU, UWB, NFC, low-frequency communication, and high-frequency communication.

The controller may further include a body processor configured to control the locking member, and the authentication processor is configured to transmit authentication success information or authentication failure information for the user authentication to the body processor, the body processor is configured to control unlocking of the door in response to that a manipulation signal is received from the manipulation member in a state in which the authentication success information is received, control communication with the external device in response to that the authentication failure information is received, and control unlocking of the door based on whether a communication connection with the external device exists.

The authentication processor, the facial recognition processor and the body processor may be configured to perform controller area network (CAN) communication with each other.

the authentication processor may be configured to determine whether a predetermined time has elapsed from a time when the facial recognition processor wakes up, and transmit a power-off instruction to the facial recognition processor if the face information is not received from the facial recognition processor after the predetermined time has elapsed.

The authentication processor may be configured to identify the number of users based on the received face information, and determine that authentication fails in response to the number of identified users is plural.

BRIEF DESCRIPTION OF THE DRAWINGS

These and/or other aspects of the disclosure will become apparent and more readily appreciated from the following description of the exemplary embodiments, taken in conjunction with the accompanying drawings, of which.

DETAILED DESCRIPTION

Figure 1:
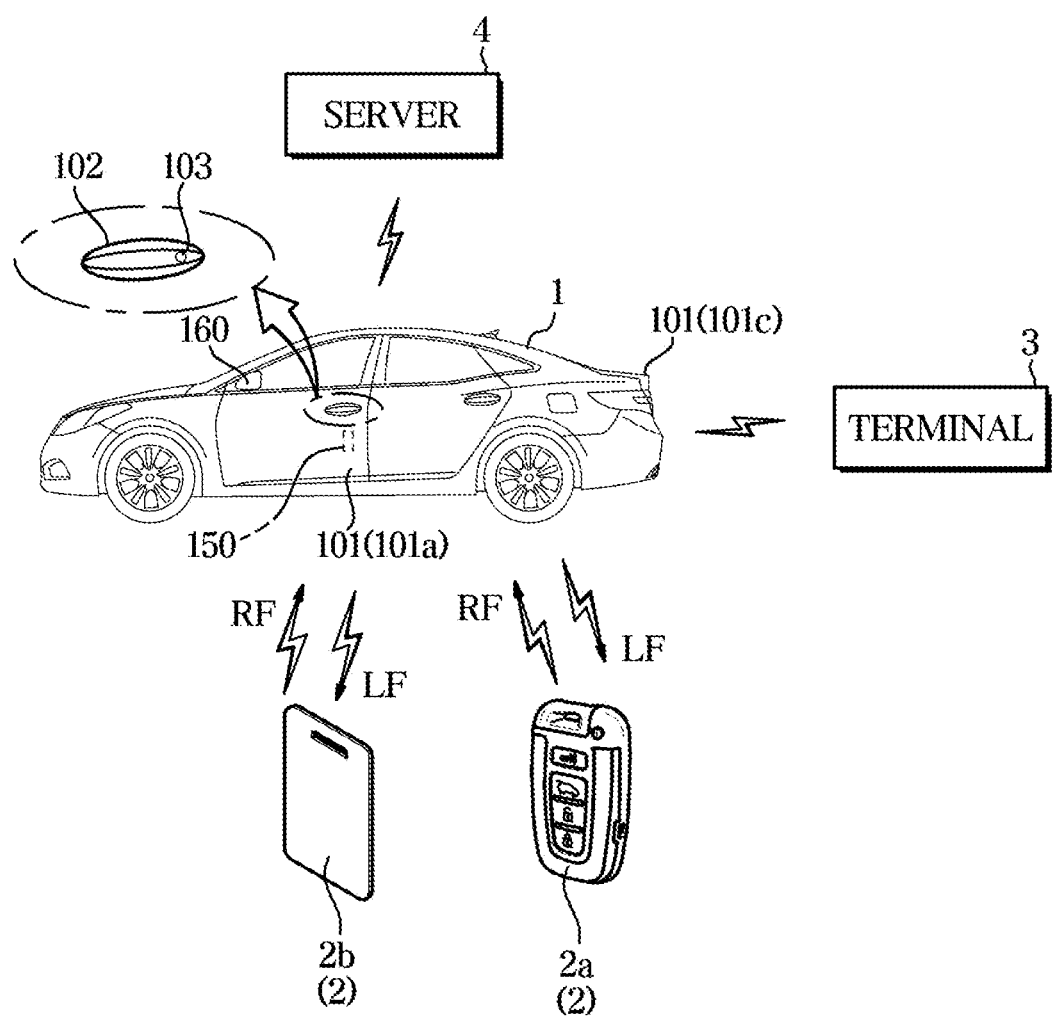
FIG. 1 is a view illustrating communication of a vehicle according to an exemplary embodiment of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the term "and/or" includes any and all combinations of one or more of the associated listed items.

Like numerals refer to like elements throughout the specification. Not all elements of embodiments of the disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a member is "on" another member, the member may be directly in contact with the other member or a third member may be disposed therebetween.

Terms such as "unit", "group", "block", "member", "module," "-er," and "-or" used in the specification may be implemented by software or hardware components and combinations thereof. Terms such as "unit", "group", "block", "member", "module," "-er," and "-or" may refer to a unit that processes at least one function or operation. In addition, terms such as "unit", "group", "block", "member", "module," "-er," or "-or" are used in at least one piece of hardware such as a field-programmable gate array (FPGA)/application specific integrated circuit (ASIC), or at least one software or processor stored in a memory.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Although the terms "first," "second," "A," "B," etc. may be used to describe various components, the terms do not limit the corresponding components, but are used only for the purpose of distinguishing one component from another component.

As used herein, the singular forms "a," "an," and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, operating principles and embodiments of the disclosure will be described with reference to the accompanying drawings.

Figure 2:
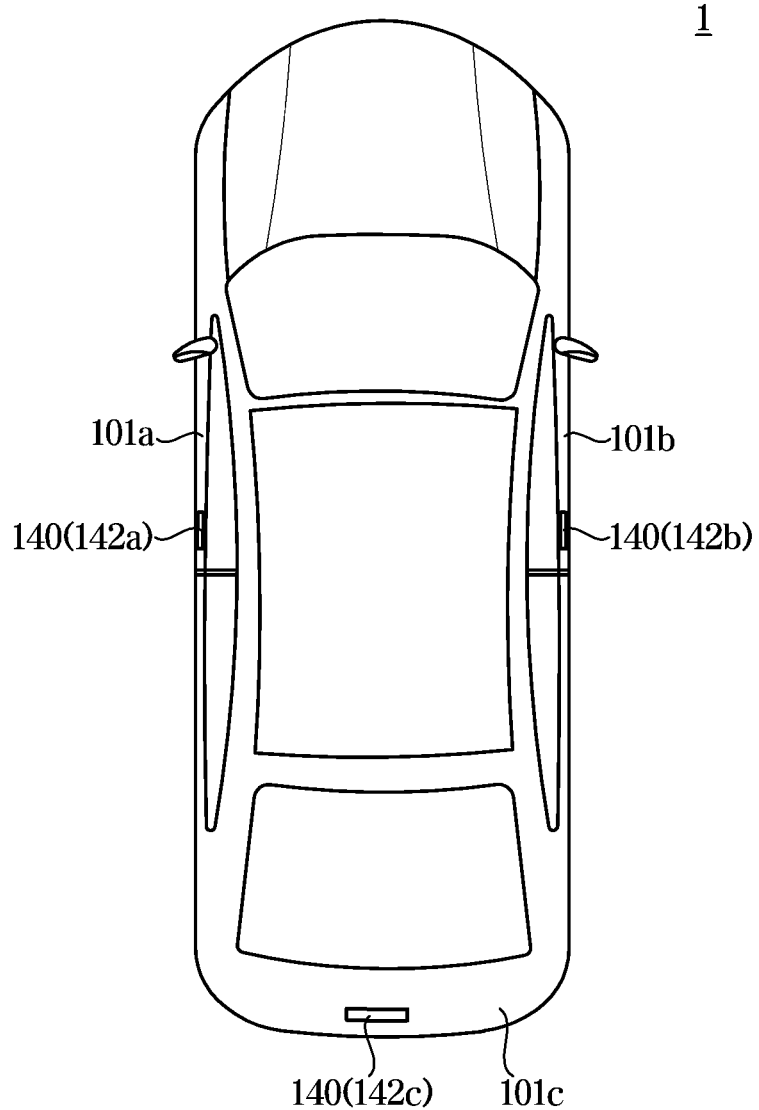
FIG. 2 is a view illustrating an arrangement of antennas provided in a vehicle according to an embodiment of the disclosure.
Figure 3:
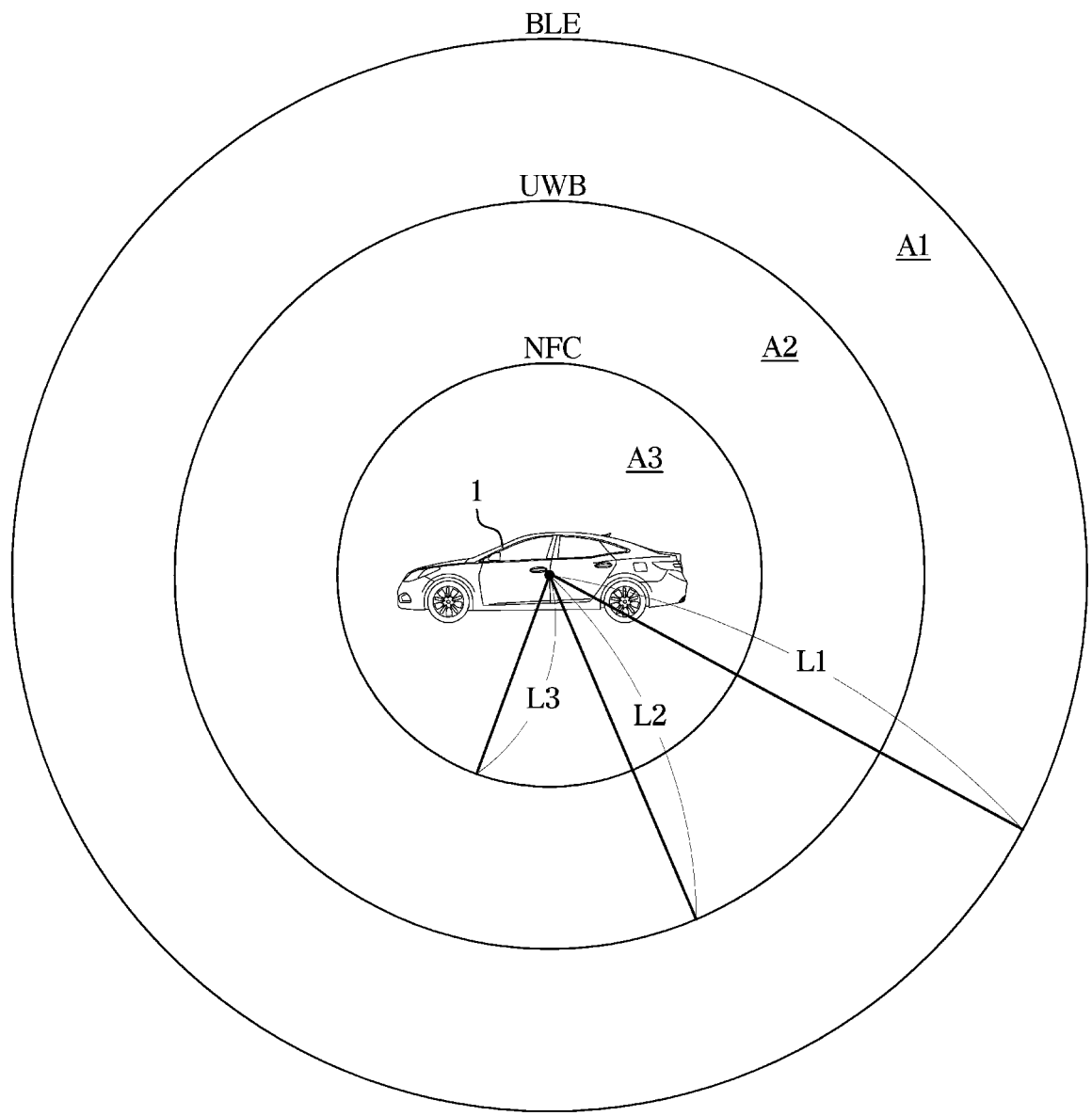
FIG. 3 is a view illustrating a communication distance and a communication area for each communication module provided in a vehicle according to an embodiment of the disclosure.

FIG. 1 is a view illustrating communication of an example vehicle according to an embodiment of the disclosure, FIG. 2 is a view illustrating an example arrangement of antennas provided in a vehicle according to an embodiment of the disclosure. FIG. 3 is a view illustrating a communication distance and communication area for each communication module provided in a vehicle according to an embodiment of the disclosure.

As shown in FIG. 1, a vehicle 1 may communicate with at least one of a remote controller 2 (such as a remote control car key) a terminal 3, and a server 4. The configurations of the vehicle 1 for performing communication with the at least one of the remote controller 2, the terminal 3, and the server 4 will be described first.

The vehicle 1 includes a body having an interior and exterior, and a chassis in which mechanical devices necessary for driving are installed as the remaining parts except for the body.

The chassis of the vehicle refers to a frame that supports the body of the vehicle, and may include a power device, a braking device, and a steering device for respectively applying a driving force, a braking force, and a steering force to wheels (front, rear, left and right), and further include a suspension device, a transmission device, and the like.

Referring to FIGS. 1 and 2, the exterior of the vehicle body may include front, rear, left and right doors 101a and 101b (collectively, 101), and may further include a tailgate 101c provided at a rear of the vehicle body.

The doors 101a and 101b (101) and the tailgate 101c are provided with a handle 102 that may be held by a user, and the handle 102 has a manipulation member 103 for receiving a user's open/close instruction.

The manipulation member 103 may be provided in various types, such as a switch type, a button type, a touch type (e.g., reactive to the touch of a user), and a lever type. In this embodiment, a touch type manipulation member will be described as an example.

The doors 101a and 101b (101) and the tailgate 101c may be provided with a locking member 150 for performing locking and unlocking.

The vehicle may further include a side mirror 160 that provides a driver with a view of the rear of the vehicle 1, and may further include a mirror adjustment member (not shown) for folding or unfolding the side mirror 160.

The interior of the vehicle body 1 includes a seat on which an occupant (such as the user of the vehicle) sits, a dashboard, and a head unit for receiving a user input and displaying operation information of at least one electrical device.

Herein, the seat may be divided into a driver seat, a (front) passenger seat, and a rear passenger seat based on the arrangements. Each seat may be provided with a seat adjustment member (not shown) capable of adjusting a distance and height from the dashboard and an angle of a backrest based on the dashboard.

An inputter for receiving an operation instruction and operation information of at least one electrical device may be provided in the head unit, and a display may be provided to display operation information of various functions that may be performed in the vehicle and information corresponding to a user input.

The inputter may be provided in a center fascia of the vehicle, and the inputter provided in the center fascia and the head unit may be provided in at least one of a jog dial type, a button type, and a touch pad type.

The vehicle may further include a start button. The vehicle may control activation and deactivation of the start button in response to user authentication success and failure.

The vehicle 1 may further include a communicator 140 configured to perform communication with at least one of the remote controller 2, the user terminal 3, and the server 4.

The communicator 140 may include one or more components that enable communication between components inside the vehicle other than an external device (e.g., device external to the vehicle, such as the remote controller 2), and may include, for example, at least one of a short-range communication module, a wired communication module, and a wireless communication module.

The short-distance communication module may include various short-range communication modules for transmitting and receiving signals using a wireless communication network in a short-range, for example, a Bluetooth module, an infrared communication module, a Radio Frequency Identification (RFID) communication module, a Wireless Local Access Network (WLAN) communication module, a Near Field Communication (NFC) module, and a Zigbee communication module, and the like.

The wired communication module may include a variety of wired communication modules such as a Controller Area Network (CAN) communication module, a Local Area Network (LAN) module, a Wide Area Network (WAN) module, or a Value Added Network (VAN) module, and the like, and various cable communication such as Universal Serial Bus (USB), High Definition Multimedia Interface (HDMI), Digital Visual Interface (DVI), Recommended Standard 232 (RS-232), power line communication, and Plain Old Telephone Service (POTS), and the like.

The wired communication module may further include a Local Interconnect Network (LIN).

The wireless communication module may include a wireless communication module supporting various wireless communication methods such as, a Wireless Fidelity (Wifi) module, a Wireless Broadband (WiBro) module, a global System for Mobile Communication (GSM) module, a Code Division Multiple Access (CDMA) module, a Wideband Code Division Multiple Access (WCDMA) module, a Universal Mobile Telecommunications system (UMTS) module, a Time Division Multiple Access (TDMA) module, a Long Term Evolution (LTE) module, and a Ultra Wide Band (UWB) module, and the like.

The communicator may be divided into different modules according to an external device that communicate with the vehicle.

For example, as shown in FIG. 2, the communicator 140 of the vehicle 1 may additionally include a second communication module for performing communication with the remote controller. The second communication module may include at least one of a low frequency communication module and a high-frequency communication module.

The low frequency communication module may be a communication module for transmitting and receiving a low frequency (LF) signal, and the high-frequency communication module may be a communication module for receiving a radio frequency (RF) signal transmitted from a remote controller.

The communication module for performing communication with the remote controller 2 may include a plurality of antennas 142a, 142b, and 142c.

The plurality of antennas may include a first antenna 142a provided in the door 101a of driver side, a second antenna 142b provided in the door 102b of (front) passenger side, and a third antenna 142c provided in the tailgate 101c.

The arrangement positions of the plurality of antennas are not limited thereto and may be changed according to various embodiments. For example, some of the plurality of antennas may be further provided on a front window glass, a roof panel, a rear window glass, and a rear seat door.

The plurality of antennas may be a LF antenna or a RF antenna.

As another example, the communicator 140 of the vehicle may include a first communication module to communicate with the terminal 3. The first communication module may include any one or two or more of a Bluetooth communication (BLU) module, an ultra-wideband communication (UWB) module, or a near field communication (NFC) module.

When the UWB module is provided in the communicator, the communicator may include a plurality of antennas for UWB communication.

When the BLU module is provided in the communicator, the communicator may include an antenna for Bluetooth communication.

When the NFC module is provided in the communicator, the communicator may include an antenna for short-range wireless communication.

As shown in FIG. 3, the BLU module enables communication within a first area A1 having a first communication distance L1 as a radius, and the UWB module enables communication within a second area A2 having a second communication distance L2 as a radius, the short-range wireless communication module enables communication within a third area A3 having a third communication distance L3 as a radius.

Herein, the first communication distance may be a distance longer than the second communication distance, and the second communication distance may be a distance longer than the third communication distance.

The first, second, and third communication distances may be distances including a predetermined first reference distance for waking up a facial recognition processor of the vehicle. In other words, the predetermined first reference distance may be shorter than the first, second, and third communication distances.

Furthermore, the communication distance of the second communication module may be equal to or longer than the predetermined first reference distance, and may be shorter than the first, second, and third communication distances.

As shown in FIG. 1, the remote controller 2 may include a Fob-type remote controller 2a and a Card-type remote controller 2b, and perform two-way communication with the vehicle 1.

The remote controller 2a and 2b (collectively, 2) automatically communicates with the vehicle through at least one antenna among the plurality of antennas in response to that the remote controller is close to the vehicle from outside of the vehicle. At this time, in response to a signal being received from the vehicle, the remote controller 2 transmits a remote key authentication signal for automatically communicating with the vehicle 1 through the at least one antenna.

Herein, the remote key authentication signal of the remote controller refers to a signal for authenticating the remote controller 2, and may include a signal for identification information of the remote controller 2 and a signal for strength corresponding to the received signal strength of the antenna of the remote controller 2.

The FOB-type remote controller 2a transmits a control signal corresponding to a user input to the vehicle 1 in response to the user input being received from the user after successful remote key authentication.

In response to the remote key authentication being successful, the card-type remote controller 2b may transmit a control signal for unlocking the door of the driver side, door of the front passenger side of the vehicle, and/or transmit a control signal for starting the vehicle without a separate manual operation.

The Fob-type remote controller 2a and the Card-type remote controller 2b may include the LF antenna for transmitting and receiving a low-frequency signal of the vehicle 1, and a high-frequency antenna for transmitting and receiving a high-frequency signal.

In response to the remote controller 2 being positioned close to the vehicle after successful remote key authentication, the remote controller 2 may transmit a control signal to turn on a light of the vehicle or to perform the unfolding of the side mirrors 160.

In other words, as well as the remote key authentication signal, the remote controller 2 may further transmit at least one of a door unlock control signal, an ignition control signal, a light on control signal, and a folding control signal of the side mirrors.

The user terminal 3 (or referred to as terminal) may perform a user registration through an application, receive and store the vehicle's electronic key (or referred to digital key). Herein, the electronic key may include control information of the vehicle. In the electronic key, information on the user terminal and information on the vehicle may be stored.

For example, the user terminal 3 may switch the door of the vehicle to the locked state or unlocked state by remotely controlling the state of the locking member using the stored electronic key, control the operation of various electrical devices provided in the vehicle using the stored electronic key, and control the starting of the vehicle.

The user terminal 3 communicates with the vehicle 1, further receives, through a user input, at least one of a door lock and unlock instruction, a tailgate lock and unlock instruction, a lamp turn on instruction, and a lamp turn off instruction, and transmits a control signal corresponding to the received user input to the user terminal 3 of the vehicle 1.

The user terminal 3 may display information on a door lock completion or failure corresponding to the door lock instruction, display a door unlock completion or failure corresponding to the door unlock instruction, display a lamp turn on completion or failure corresponding to the lamp turn on instruction transmitted to the vehicle, or display the remaining time until the lamp is turned off.

The user terminal 3 may also store identification information of the vehicle when terminal registration completion information is received from the vehicle.

When performing the function of the electronic key (or digital key) of the vehicle, the user terminal 3 attempts to establish a communication connection with the vehicle.

In this embodiment, the user terminal 3 may communicate with the vehicle through at least one of a Bluetooth Low Energy (BLE) module, an UWB module, and an NFC module. The user terminal 3 may include an application (i.e., an "app") for performing a digital key function of the vehicle.

The user terminal 3 may be implemented as a computer or a portable terminal that may be connected to the vehicle via a network.

Herein, the computer includes, for example, a notebook equipped with a web browser, a desktop, a laptop, a tablet personal computer (PC), a slate PC, and the like. The portable terminal includes, as a wireless communication device that ensures portability and mobility, for example, all kinds of handheld-based wireless communication devices including a Personal Communication System (PCS), a Global System for Mobile communications (GSM), a Personal Digital Cellular (PDC), a Personal Handyphone System (PHS), a Personal Digital Assistant (PDA), an International Mobile Telecommunication (IMT)-2000, CDMA-2000, W-CDMA, WiBro terminals, and the like.

Additionally or alternatively, the computer can include wearable devices such as, smart phones, rings, bracelets, anklets, necklaces, glasses, contact lenses, or head-mounted-devices (HMDs) and the like.

The server 4 may store user information, vehicle terminal information, and vehicle information.

The user information may be identification information of a user registered in the server 4, fingerprint information of a user registered in the server 4, or identification information of the user terminal 3 possessed by the registered user.

Herein, the identification information of the user registered in the server 4 or the identification information of the user terminal 3 is information registered through an application (or app) installed in the terminal for a vehicle or the user terminal 3.

Furthermore, the user information may include a user's name registered in the server 4, a user's home address, a user's email address, a user's resident registration number, a date of birth, a user's driver license, and the like.

The identification information of the user terminal 3 is unique identification information possessed by the user terminal 3 that is distinguished from other terminals, and may include at least one of a phone number of the terminal, a WIFI MAC address of the terminal, a serial number, and an international mobile equipment identity code (IMEI).

The identification information of the user terminal 3 may be Bluetooth identification information (BTID).

The vehicle information may include a vehicle type, a model type, identification information (license plate) of the vehicle, a power generation method (e.g., hybrid, electronic, internal combustion engine, hydrogen, etc.), a shift method, and the like.

The server 4 communicates with the vehicle terminal and the user terminal 3, and communicates with the vehicle 1.

The server 4 may allow the user to control the starting of the vehicle through the user terminal 3 based on the information regarding the electronic key received through the user terminal 3.

Figure 4:
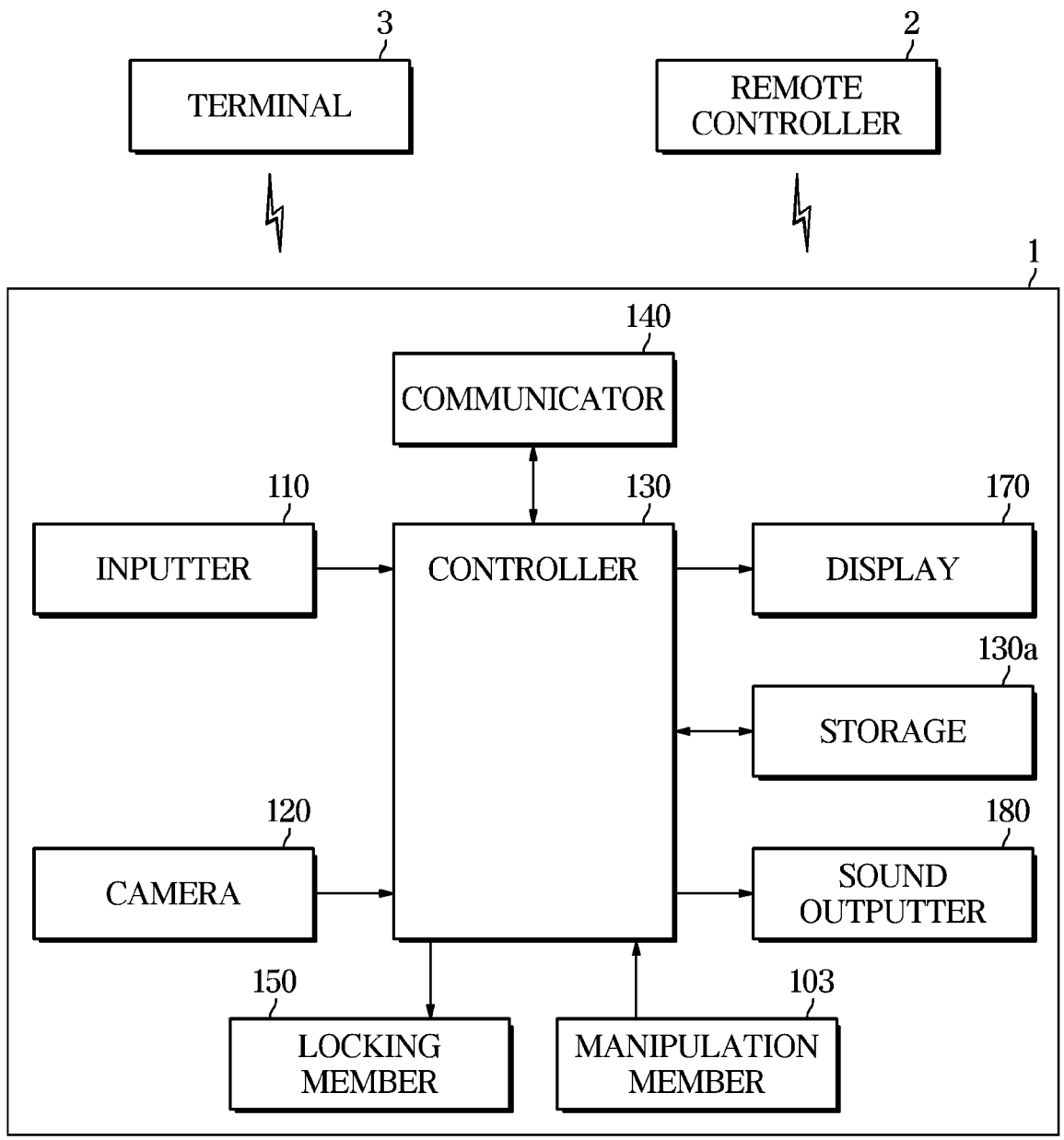
FIG. 4 is a control configuration diagram illustrating a vehicle according to an embodiment of the disclosure.
Figure 5:
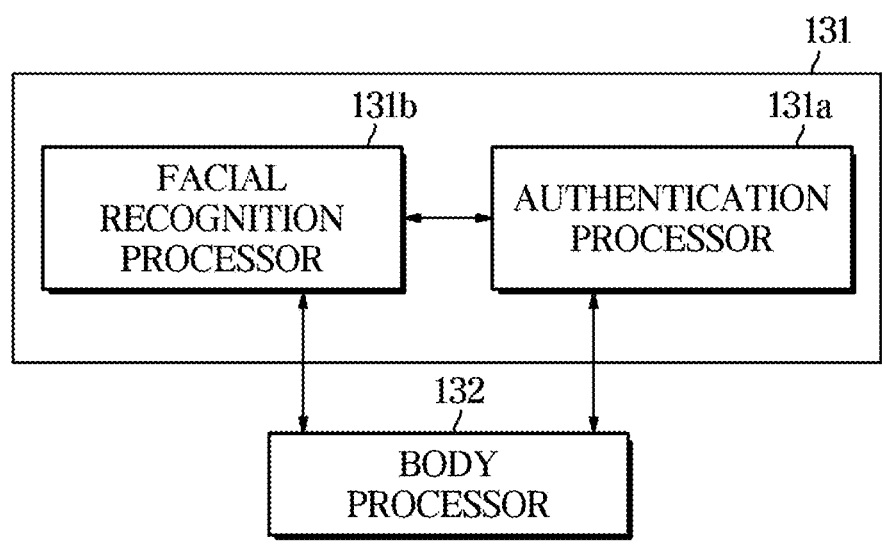
FIG. 5 is a detailed configuration diagram illustrating a controller of a vehicle according to an embodiment of the disclosure.
Figure 6:
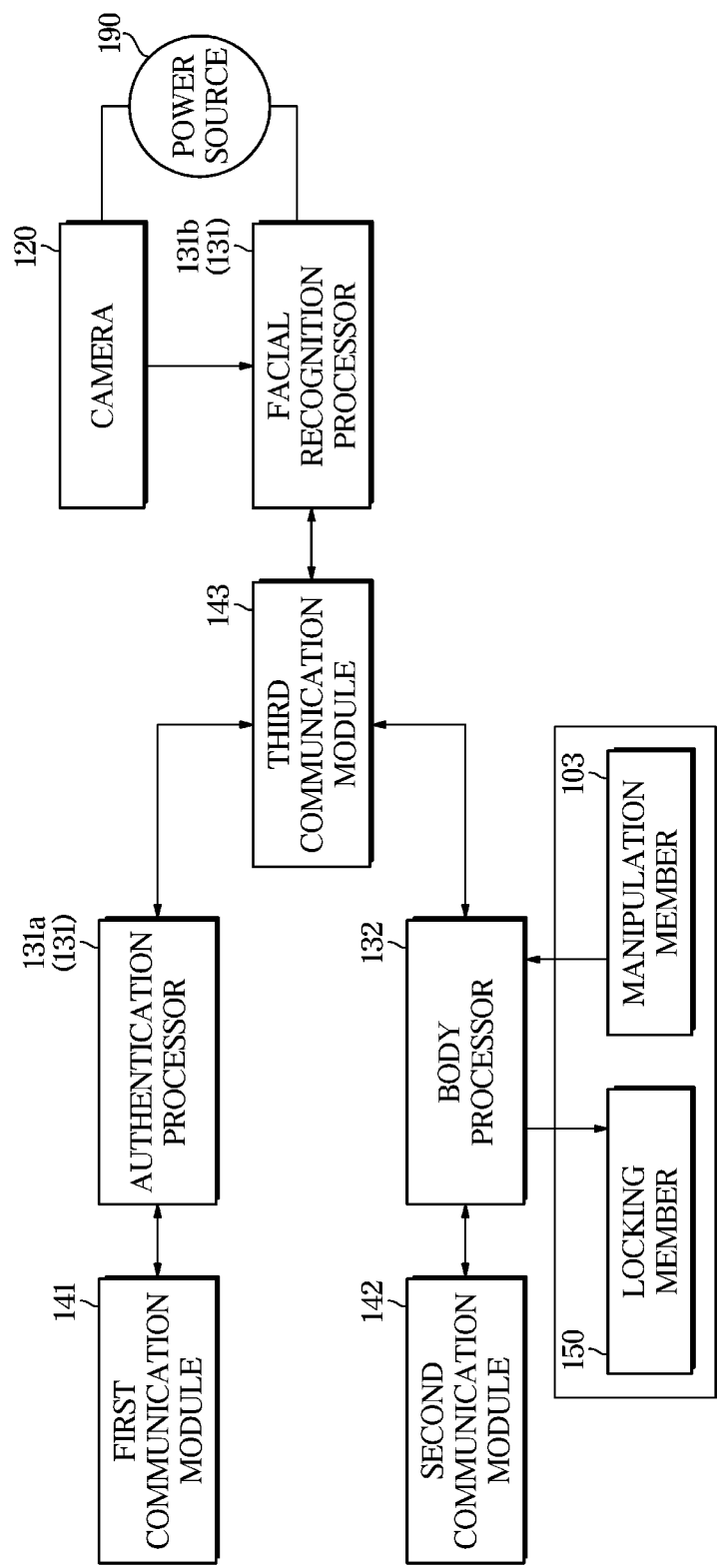
FIG. 6 is a view illustrating communication of each processor provided in the controller shown in FIG. 5.

FIG. 4 is a view illustrating a control configuration of a vehicle according to an exemplary embodiment of the disclosure, FIG. 5 is a detailed configuration view illustrating a controller provided in a vehicle according to an exemplary embodiment of the disclosure, and FIG. 6 is a view illustrating a communication of the controller illustrated in FIG. 5.

As shown in FIG. 4, the vehicle 1 includes an inputter 110, a camera 120, a controller 130, a storage 130*a*, a communicator 140, a locking member 150, and the manipulation member 103, and further include a display 170, a sound outputter 180, and a power source 190.

The inputter 110 receives a user input.

The inputter 110 may receive, as the user input, a start-on instruction and a start-off instruction, a tailgate opening/closing instruction, a tailgate locking instruction and a tailgate unlocking instruction, at least one door opening/closing instruction, and at least one door locking instruction and at least one door unlocking instruction.

The inputter 110 may receive an operation instruction and operation information of at least one electrical device provided in the vehicle.

The inputter 110 may receive a user registration instruction for a user registration, and may receive a user deletion instruction for deleting some of the registered users.

The inputter 110 may receive location information of the side mirrors for each user, receive location information of a seat for each user, and receive user identification information.

The vehicle may further include the display 170 for displaying operation information of various functions that may be performed in the vehicle and information corresponding to the user input.

The display 170 may display success information and failure information of user authentication, and also may display start-on information and start-off information of the vehicle, as an image.

The vehicle may further include the sound outputter 180 for outputting failure information of user authentication as a sound.

The sound outputter 180 may output failure information of user authentication as alarm information.

The vehicle may transmit the failure information of user authentication to the user terminal 3 registered in advance.

The camera 120 is a device for obtaining an image, and may include a Charge-Coupled Device (CCD) or a Complementary Metal Oxide Semiconductor (CMOS) image sensor, and may include a camera using infrared rays.

The camera 120 may be provided around the driver seat, and may have a field of view may be provided to face the outside of the vehicle to obtain an image of the outside of the vehicle.

The camera 120 may be rotatably provided in the vehicle so that the field of view is changed. The camera 120 may rotate in a direction corresponding to a position at which the user is recognized.

The camera 120 detects object information around the vehicle and converts the object information into an electrical image signal. In other words, the camera 120 detects the object information on a front side and left and right sides of its own vehicle, and transmits the image signal of the detected object information to the controller 130.

The camera 120 may be a rear camera, a camera of a black box, a camera of an autonomous driving control device provided for autonomous driving, or a camera for user authentication.

The camera 120 may perform a sleep mode or a wake-up mode in response to an instruction from the authentication device. The camera 120 may be supplied with power under the control of the authentication device or cut off the supplied power.

In response to the user registration instruction being received through the inputter 110, the controller 130 may activate the camera 120 and an authentication device 131 to recognize a face of the user based on the image information obtained by the camera 120 and store the face information on the recognized face. Herein, the controller 120 may control the storage 130*a* so that the storage 130*a* may store the face information together with the identification information of the user.

Additionally, in response to the user registration instruction being received through the inputter 110, the position information of the side mirrors and the position information of the seat input by the inputter 110 are received, the controller 130 may control the storage 130*a* so that the storage 130*a* may store the received position information of the side mirrors and the received position information of the seat together with the identification information of the user. The controller 130 may determine whether the ignition of the vehicle is in an on-state or in an off-state, determine whether the user gets in or out of the vehicle, and obtain a distance information of the user from the vehicle based on the received signal strength of the signal received through the communicator 140. It is understood that references herein to the user also may refer to a remote (e.g. external to the vehicle) controller e.g. key to the vehicle.

The controller 130 may control locking and unlocking of the door based on the result of the user authentication, and may control an alarm output.

The controller 130 obtains the distance information with the user based on the received signal strength of the signal received through the communicator 140, and determines whether the distance with the user is less than or equal to a first reference distance based on the obtained distance information with the user and reference distance information. In addition, in response to the distance with the user being less than or equal to the first reference distance, the controller 130 may control a booting of a facial recognition processor 131*b* and a booting of the camera 120. At this time, the facial recognition processor 131*b* and the camera 120 may perform a wake-up mode.

In a state in which the facial recognition processor 131*b* is woken up, the controller 130 obtains the distance information with the user based on the received signal strength of the signal received through the communicator 140, and determines whether the distance with the user is less than or equal to a second reference distance based on the obtained distance information with the user and the reference distance information. In addition, in response to that the distance with the user is less than or equal to the second reference distance, the controller 130 performs the facial recognition for the user located at a distance less than or equal to the second reference distance by controlling the operations of the facial recognition processor 131*b* and the camera 120.

In this case, the facial recognition processor 131*b* may recognize a face based on the image information obtained by the camera 120.

The controller 130 performs the user authentication through facial recognition, controls to unlock the door in response to the user authentication being successful, and control to keep the door locked and control the alarm output in response to the user authentication being failed.

When controlling the alarm output, the controller 130 may control lamps provided on the exterior of the vehicle, control the display, or control the sound outputter.

In response to the user authentication being successful, the controller 130 attempts the communication connection with the at least one of the remote controller and the terminal, and in response to the communication connection with the at least one of the remote controller and the terminal being available, the controller 130 may control the unlocking of the door.

In response to the user authentication being successful, the controller 130 receives an encryption signal from the remote controller, compares the received encryption signal with a pre-stored encryption signal, determines that an immobilizer authentication is successful in response to that the received encryption signal and the pre-stored encryption signal are the same, and may control activation of the start button to turn on the ignition in response to the input signal of the start button being received when the immobilizer authentication is successful.

In response to the user authentication being successful, the controller 130 determines whether manipulation signal (e.g., a touch signal) is received from the manipulation member 103, and may control the operation of the locking member 150 to unlock the door in response to the manipulation signal being received from the manipulation member 103.

In response to the user authentication being successful, the controller 130 may adjust the seat position based on the position information of the seats or may adjust the position of the side mirrors based on the position information of the side mirrors. In other words, the controller 130 may control the operations of the seat adjusting member and the mirror adjusting member of the side mirrors.

In response to the user authentication being successful, the controller 130 may control activation of the start button, and in response to the user authentication being failed, the controller 130 may control deactivation of the start button.

For example, in response to the user authentication being successful through the facial recognition, the controller 130 may control the activation of the start button, and control the ignition of vehicle if the start button is operated by the user while the start button is activated. In response to the user authentication being failed through the facial recognition, the controller 130 controls the deactivation of the start button, and then in response to the authentication being successful through the remote controller 2 or the user terminal 3, the controller 130 controls the activation of the start button and control the ignition of the vehicle if the start button is operated by the user while the start button is activated.

The controller 130 determines whether the user gets off based on a door opening/closing signal, determines whether the touch signal is received from the manipulation member 103 in response to that the user gets off, and controls the operation of the locking member 150 to lock the door in response to the touch signal being received from the manipulation member 103.

The controller 130 obtains the distance information with the user based on the received signal strength of the signal received through the communicator 140 in a state in which the user gets off, and determines whether the distance with the user is less than or equal to the first reference distance based on the obtained distance information with the user and the reference distance information. In addition, in response to that the distance with the user exceeds the first reference distance, the controller 130 may control the facial recognition processor 131b and the camera 120 to be switched to the sleep mode, and control the power source 190 so that the power supplied to the facial recognition processor 131b and the camera 120 is cut off.

The configuration of such a controller will be described in detail with reference to FIGS. 5 and 6.

As shown in FIG. 5, the controller 130 includes the authentication device 131 including an authentication processor 131a for a user authentication and a facial recognition processor 131b for recognizing a user face, and a body processor 132 for controlling the locking and unlocking of the door(s) 101.

The authentication processor 131a, the facial recognition processor 131b, and the body processor 132 may transmit/receive various types of information via CAN communication.

As shown in FIG. 6, the authentication processor 131a may transmit a booting instruction or a power-off instruction to the facial recognition processor 131b based on the received signal strength of the signal received by a first communication module 141, and may transmit a facial recognition instruction.

The body processor 132 may transmit the booting instruction or the power-off instruction to the facial recognition processor 131b based on the received signal strength of the signal received by a second communication module 142, and may transmit the facial recognition instruction.

The facial recognition processor 131b may perform the wake-up mode in response to reception of the booting instruction, perform the sleep mode in response to reception of the power-off instruction, and perform a facial recognition mode in response to the facial recognition instruction.

In other words, the facial recognition processor 131b may recognize a face based on image information obtained by the camera after the wake-up is completed, and control to transmit the face information on the recognized face through a third communication module 143 to the authentication processor 131a and the body processor 132.

The authentication device 131 of this embodiment will be described as an example of a device that performs the user authentication based on the face information of the user recognized.

The authentication device described above is a device for performing the user authentication for a user having a vehicle's control right. The authentication device may further include at least one of a fingerprint recognition processor, an iris recognition processor, and a voice recognition processor.

The fingerprint recognition processor may receive fingerprint information from at least one of a capacitive fingerprint sensor that detects a difference in capacitance according to a curvature of the fingerprint, an optical fingerprint sensor that detects the curvature of the fingerprint according to a shade of the reflected light after outputting a light source, and an ultrasonic fingerprint sensor that scans minute features of a epidermal layer of the skin. The fingerprint recognition processor recognizes fingerprint information on the detected fingerprint.

The authentication processor may determine whether the user who has recognized the fingerprint is a pre-registered user by comparing the recognized fingerprint information with the fingerprint information stored in the storage 130a.

The fingerprint sensors may include a CCD camera, a CCD scanner, and a thermal sensor.

The iris recognition processor may obtain an iris image from image information received from the camera and obtain code information from the obtained iris image. In this case, the authentication processor may determine whether the current user is the pre-registered user by comparing the obtained code information with the pre-registered user's iris code information stored in the storage 130a.

The voice recognition processor may recognize a voice from the sound received through the microphone. In this case, the authentication processor may determine whether the current user is the pre-registered user based on voice information of the recognized voice and voice information stored in the storage 130a.

The controller 130 performs overall control of the driving of the authentication device and the vehicle.

The controller 130 may be implemented as a memory (not shown) that stores data for algorithms for controlling the operation of components in the vehicle or programs reproducing the algorithms, and a processor (not shown) that performs the above-described operation using the data stored in the memory. In this case, the memory and the processor may be implemented as separate chips. Alternatively, the memory and the processor may be implemented as a single chip.

Example One

When the first communication module is provided in the communicator, the configuration of the controller will be described.

The authentication processor 131a obtains distance information with the terminal 3 based on the received signal strength of the signal received through the first communication module 141. In other words, in response to a communication connection signal of the terminal 3 being received through the first communication module, the authentication processor 131*a* may obtain the distance information with the terminal 3 based on transmission power in the packet and the received signal strength of the signal transmitted from the terminal 3.

The authentication processor 131*a* may determine whether the distance with the terminal 3 exceeds the first reference distance based on the obtained distance information with the terminal 3 and a predetermined reference distance information, and in response to determining that the distance with the terminal 3 exceeds the first reference distance, may transmit the power-off instruction to the facial recognition processor 131*b* and transmit the power-off instruction to the camera.

At this time, the facial recognition processor 131*b* switches to the sleep mode in response to reception of the power off instruction, and the camera 120 also switches to the sleep mode.

In response to determining that the distance with the terminal 3 is less than or equal to the first reference distance, the authentication processor 131*a* transmits the booting instruction to the facial recognition processor 131*b* and also transmits the booting instruction to the camera. At this time, the facial recognition processor 131*b* switches to the wake-up mode in response to reception of the booting instruction, and the camera 120 also switches to the wake-up mode.

After the booting of the facial recognition processor 131*b* is completed, the authentication processor 131*a* obtains the distance information with the terminal based on the received signal strength of the signal received through the first communication module 141, and determines whether the distance with the terminal exceeds the second reference distance based on the obtained distance information with the terminal and the predetermined reference distance information. The authentication processor 131*a* may maintain the facial recognition processor in a wake-up state in response to determining that the distance with the terminal exceeds the second reference distance, and transmit the facial recognition instruction to the facial recognition processor in response to determining that the distance with the terminal is less than or equal to the second reference distance.

The facial recognition process 131*b* performs the facial recognition mode based on the image information obtained through the camera in response to reception of the facial recognition instruction.

The facial recognition process 131*b* may transmit the face information recognized while performing the facial recognition mode to the authentication processor.

The authentication processor 131*a* determines whether the user with the received face information is the pre-registered user based on the received face information and the face information stored in the storage. The authentication processor 131*a* transmits user authentication success information to the body processor in response to determining that the user with the received face information is the pre-registered user, and transmits user authentication failure information to the body processor in response to determining that the user with the received face information is not the pre-registered user.

The body processor determines whether a touch signal is received from the manipulation member in response to reception of the user authentication success information, and controls the unlocking operation of the locking member so that the door is unlocked in response to determining that the touch signal is received from the manipulation member.

The body processor controls the alarm output in response to reception of the user authentication failure information, and then determines whether the touch signal is received from the manipulation member. The body processor may communicate with the in response to determining that the touch signal is received from the manipulation member, control the unlocking operation of the locking member so that the door is unlocked after the user authentication is performed based on the remote key authentication signal received from the remote controller.

In response to reception of information on the touch signal being received from the body processor 132, the authentication processor 131*a* may communicate with the terminal 3, perform the user authentication based on the electronic key received from the terminal 3, and then control the unlock operation of the locking member so that the door is unlocked.

The body processor 132 determines whether the user gets off based on the door opening/closing signal in a state in which the engine is turned off, and in response to determining that the user gets off, the body processor 132 transmits the facial recognition instruction to the facial recognition processor 131*b* in response to reception of the touch signal of the manipulation member. Furthermore, in response to reception of the user authentication success information from the authentication processor 131*a*, the body processor 1312 may control the lock operation of the locking member so that the door is locked and transmit information on the lock control of the door to the authentication processor 131*a*.

The body processor 132 may transmit the facial recognition instruction to the facial recognition processor 131*b* in response to reception of the touch signal of the manipulation member after the user gets out of the vehicle, and control the unlock operation of the locking member so that the unlocked state of the door is maintained in response to the user authentication failure information being received from the authentication processor 131*a*.

After the lock control of the door is completed, the authentication processor 131*a* may obtain the distance information with the terminal based on the received signal strength received from the first communication module 141, and in response to determining that the distance with the terminal exceeds the first reference distance based on the obtained distance information with the terminal 3, the body processor 132 transmits the power-off instruction to the facial recognition processor 131*b* and transmit the power-off instruction to the camera 120. At this time, the facial recognition processor and the camera 120 switch to the sleep mode in response to reception of the power-off instruction.

Example Two

When the first communication module is provided in the communicator, the configuration of the controller will be described.

The body processor 132 obtains distance information with the remote controller 2 based on the received signal strength of the signal received through the second communication module 142, and determines whether the distance with the remote controller 2 exceeds the first reference distance based on the obtained distance information with the remote controller 2 and the predetermined reference distance information, and in response to determining that the distance with the remote controller 2 exceeds the first reference distance transmits the power-off instruction to the facial recognition processor 131*b* and transmits the power-off instruction to the camera 120. At this time, the facial recognition processor 131b and the camera 120 perform the sleep mode in response to reception of the power-off instruction.

For example, when transmitting a signal for authentication to the remote controller, the body processor 132 converts digital transmission data into a low-frequency transmission signal, transmits the converted low-frequency transmission signal to any one antenna, and after a certain time is lapsed, the converted low-frequency transmission signal is transmitted to the others antenna.

The body processor 132 converts the received high-frequency reception signal into digital reception data, and obtains a received signal strength value corresponding to a signal transmitted from each antenna by using the converted digital reception data.

In other words, the body processor 132 receives the high-frequency signal transmitted from the remote controller 2, obtains information on the strength of the received signal from the received high-frequency signal, and identifies a received signal strength value from the obtained information.

Herein, the received signal strength value is a power value of a signal received by the antenna, is a received signal strength indicator (RSSI) value.

In response to determining that the distance with the remote controller 2 is less than or equal to the first reference distance, the body processor 132 transmits the booting instruction to the facial recognition processor 131b and the booting instruction to the camera 120.

In this case, the facial recognition processor 131b and the camera 120 may receive power from the power source in response to reception of the booting instruction. Furthermore, the facial recognition processor 131b may perform the wake-up mode in response to reception of the booting instruction, and the camera 120 may also perform the wake-up mode in response to reception of the booting instruction.

After the booting of the facial recognition processor 131b is completed, the body processor 132 obtains the distance information with the remote controller 2 based on the received signal strength of the signal received through the second communication module 142, and determines whether the distance with the remote controller 2 exceeds the second reference distance based on the obtained distance information with the remote controller 2 and the predetermined reference distance information. The body processor 132 may maintain the facial recognition processor 131b in the wake-up state in response to determining that the distance with the remote controller 2 exceeds the second reference distance, and transmit the facial recognition instruction to the facial recognition processor 131b in response to determining that the distance with the remote controller is less than or equal to the second reference distance.

The facial recognition process 131b performs the facial recognition mode based on the image information obtained through the camera 120 in response to reception of the facial recognition instruction. The facial recognition process 131b may transmit the face information recognized to the authentication processor while performing the facial recognition mode.

The face authentication process of the authentication processor 131a is the same as the previous process (example 1), so a description thereof will be omitted.

The body processor 132 determines whether the touch signal is received from the manipulation member 103 in response to reception of the user authentication success information, and controls the unlocking operation of the locking member 150 so that the door is unlocked in response to determining that the touch signal is received from the manipulation member 103.

The body processor 132 controls the alarm output in response to reception of the user authentication failure information, and then determines whether the touch signal is received from the manipulation member. The body processor 132 may communicate with the remote controller 2 in response to determining that the touch signal is received from the manipulation member 103, control the unlocking operation of the locking member so that the door is unlocked after the user authentication is performed based on the remote key authentication signal received from the remote controller 2.

The body processor determines whether the user gets out of the vehicle based on the door opening/closing signal in a state in which the engine is turned off, and in response to determining that the user gets out of the vehicle, the body processor transmits the facial recognition instruction to the facial recognition processor 131a in response to reception of the touch signal of the manipulation member. Furthermore, in response to reception of the user authentication success information from the authentication processor 131a, the body processor may control the lock operation of the locking member so that the door is locked and transmit the information on the lock control of the door to the authentication processor 131a.

The body processor 132 may transmit the facial recognition instruction to the facial recognition processor 131b in response to reception of the touch signal of the manipulation member after the user gets out of the vehicle, and control the unlock operation of the locking member so that the unlocked state of the door is maintained in response to the user authentication failure information being received from the authentication processor.

After the lock control of the door is completed, the authentication processor 132 may obtain the distance information with the remote controller 2 based on the received signal strength received from the second communication module 142, and in response to determining that the distance with the remote controller 2 exceeds the first reference distance based on the obtained distance information with the remote controller 2 and the reference distance information transmit the power-off instruction to the facial recognition processor 131b and transmit the power-off instruction to the camera 120. At this time, the facial recognition processor 131b and the camera 120 switches to the sleep mode in response to reception of the power-off instruction.

The first reference distance may be approximately 2.5 m, and the second reference distance may be approximately 1 m. However, other distances are contemplated. For example, the first reference distance may be more or less than 2.5 m (e.g., 2 m, 3, or the like). Further, the second reference distance may be more or less than 1 m (e.g., 0.5 m, 1.5 m, or the like).

Herein, the first reference distance may be a distance communicable by the first and second communication modules.

Example Three

The controller may obtain distance information with the terminal based on the received signal strength received by the first communication module provided in the authentication processor 131a, and obtain distance information with the remote controller based on the received signal strength received by the second communication module provided in the body processor, and control the booting and power-off of the facial recognition processor and the booting and power-off of the camera based on the distance information with the terminal and the distance information with the remote controller and also control the facial recognition of the facial recognition processor.

Example Four

The controller may include a distance recognition processor (not shown) that performs communication with the first and second communication modules, receives the received signal strength from one or two of the first and second communication modules, and obtains distance information with the user based on the received signal strength.

The distance recognition processor (not shown) obtains the distance information with the terminal based on the received signal strength in response to that the signal of the terminal is received by the first communication module, and transmit the obtained distance information with the terminal to at least one of the authentication processor and the body processor.

In response to that the signal of the remote controller is received by the second communication module, the distance recognition processor (not shown) obtains the distance information with the remote controller based on the received signal strength, and transmits the obtained distance information with the remote controller to the at least one of the authentication processor and the body processor.

The storage 130a stores the face information of the users and stores the identification information of the users. When there are multiple users, the storage 130a may store the identification information and the face information for each user.

The storage 130a may store seat location information and location information of the side mirrors for each user.

The storage 130a may further store the identification information of the remote controller and the identification information of the terminal, and may further store electronic key information.

The storage 130a may further store fingerprint information for each user, voice information for each user, and iris information for each user.

The storage 130a may store reference distance information. The reference distance information may include information on the first and second reference distances.

The storage 130a may store the identification information and location information of a plurality of antennas.

The storage 130a may be implemented as at least one of a nonvolatile memory device such as a cache, a read only memory (ROM), a programmable ROM (PROM), an erasable programmable ROM (EPROM), an electrically erasable programmable ROM (EEPROM), and flash memory, or a volatile memory device such as a random-access memory (RAM), or a storage medium such as a hard disk drive (HDD) and a CD-ROM, but is not limited thereto.

The storage 130a may be a memory implemented as a chip separate from the processor described above relating to the controller 130, or may be implemented as a single chip with the processor.

The communicator 140 may include a plurality of communication modules that perform communication in different communication manners.

The first communication module 141 may be a communication module for performing communication with the terminal 3.

The first communication module 141 may be a communication module provided in the authentication device.

The first communication module 141 may include one or more of a BLE module, an UWB module, and a NFC module.

When receiving the signal of the terminal, the first communication module 141 may receive information regarding the received signal strength together.

The second communication module 142 may be a communication module for performing communication with the remote controller 2. The second communication module 142 may include a plurality of antennas.

The second communication module 142 may be a communication module provided in the body processor.

Because the second communication module 142 only needs to transmit a signal for recognizing the existence of the remote controller 2, the second communication module 142 may perform the low-frequency communication capable of transmitting an amount of information less than a certain amount of information and performing long-distance communication against the same power.

The second communication module 142 may obtain the information on the received signal strength based on the signal received through at least one of the plurality of antennas.

The third communication module 143 may include the CAN communication module for performing communication between different devices provided in the vehicle.

The third communication module 143 may perform CAN communication or an Ethernet communication with the authentication device 131, and may perform CAN communication with the body processor 132. Herein, CAN communication may be body CAN (B CAN) communication.

The locking member 150 is provided on the door and may maintain the door in the unlocked state so as to open/close of the door, or to maintain the door in the locked state so as not to open/close of the door.

The manipulation member 103 may be provided on a handle of the door, transmit an opening signal corresponding to a user's open instruction to the controller, and transmit a closing signal corresponding to a user's closing instruction to the controller.

The manipulation member 103 may be provided as a touch type, and may transmit the touch signal by the user to the controller. For example, the manipulation member 103 may transmit the touch signal corresponding to the user's intention to unlock the door to the controller, and may transmit the touch signal corresponding to the user's intention to lock the door to the controller.

At least one component may be added or deleted according to performance of the authentication device and the vehicle components shown in FIGS. 5 and 6. Furthermore, it will be readily understood by those of ordinary skill in the art that the mutual positions of the components may be changed corresponding to the performance or structure of the system.

Meanwhile, each component shown in FIGS. 5 and 6 refers to software and/or hardware components such as a Field Programmable Gate Array (FPGA) and an Application Specific Integrated Circuit (ASIC).

Figure 7:
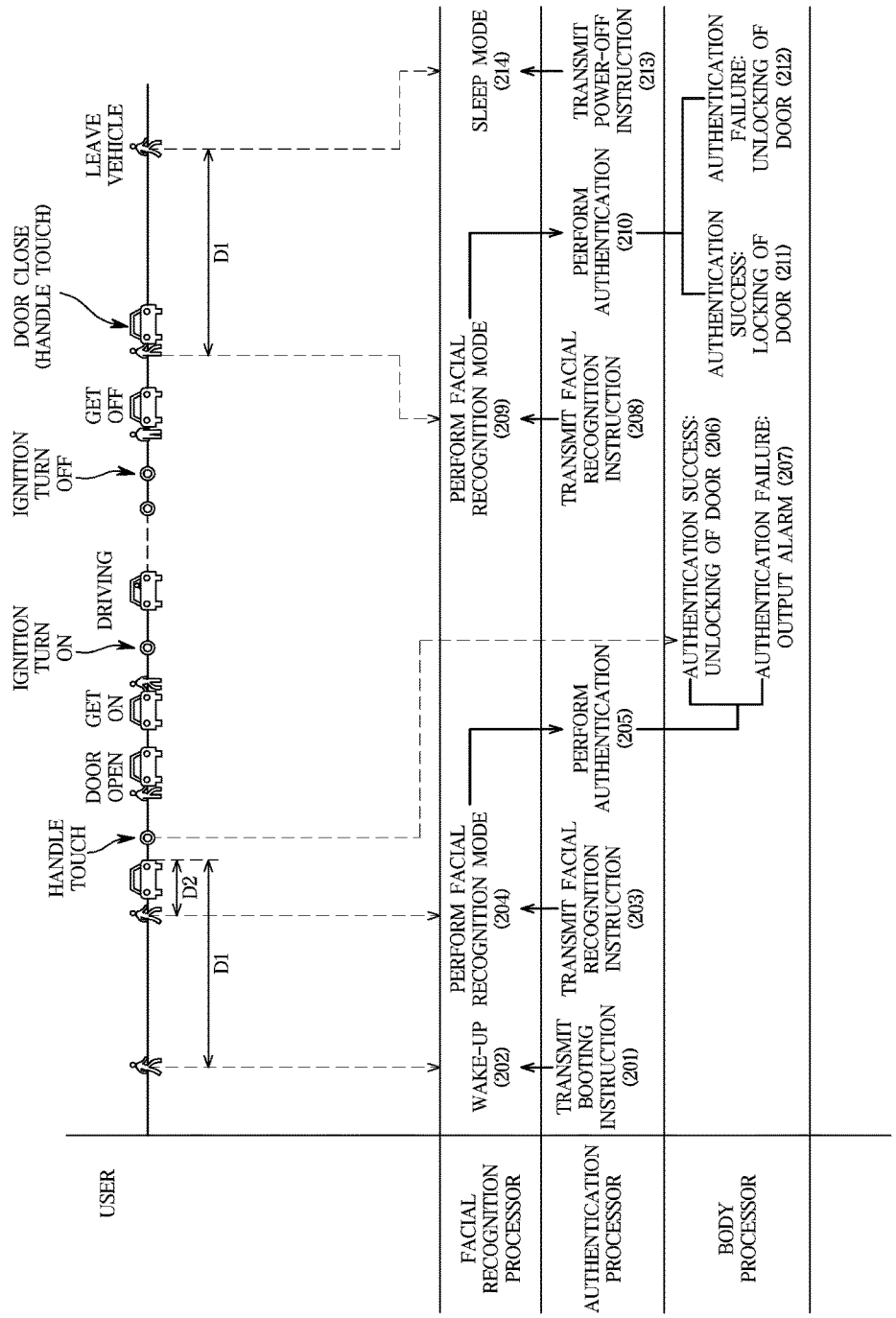
FIG. 7 is a control flowchart illustrating a vehicle according to an exemplary embodiment of the disclosure.

FIG. 7 is a control flowchart of a vehicle according to an exemplary embodiment of the disclosure.

The vehicle recognizes a user's approach through at least one of the first and second communication modules in a state in which the user gets out of the vehicle after the ignition of the vehicle is turned off.

In this case, the vehicle may transmit a terminal searching signal through the first communication module and may transmit a low-frequency searching signal through the second communication module.

When one antenna for Bluetooth is provided in the first communication module, the vehicle may transmit the terminal searching signal at a predetermined period.

When a plurality of antennas for the UWB communication are provided in the first communication module, the vehicle sequentially transmits the terminal searching signal through the plurality of antennas provided in the first communication module, but may transmit sequentially the terminal searching signal based on a predetermined order.

In response to a response signal transmitted from the terminal 3 being received through the first communication module 141, the vehicle may obtain the distance information with the terminal 3 based on the received response signal, obtain the location information of the antenna based on the identification information of the antenna from which the response signal is received, and obtain the direction information of the terminal 3 based on the obtained location information of the antenna.

The vehicle may determine whether the distance with the terminal is less than or equal to the first reference distance based on the distance information with the terminal 3, and also determine whether the distance with the terminal is less than or equal to the second reference distance.

The vehicle may determine whether the location of the terminal is near the driver seat door based on the direction information of the terminal.

In response to the signal being received by the first communication module 141, the vehicle identifies the received signal strength in the received signal, and obtains the distance information with the terminal based on the identified received signal strength. In addition, the vehicle maintains the power-off of the facial recognition processor in response to determining that the distance with the terminal 3 exceeds the first reference distance D1 based on the obtained distance information with the terminal 3 and the reference distance information, and controls the booting of the facial recognition processor in response to determining that the distance with the terminal 3 is less than or equal to the first reference distance D1. At this time, the authentication processor of the vehicle may transmit the booting instruction to the facial recognition processor through the third communication module (in operation 201). The facial recognition processor performs the wake-up mode in response to reception of the booting instruction (in operation 202).

When the low-frequency searching signal is transmitted through the second communication module, the vehicle may sequentially transmit the low-frequency searching signal through the plurality of antennas 142a, 142b, and 142c provided in the second communication module, but sequentially transmit the low-frequency searching signals based on the predetermined order. For example, the vehicle may transmit the low-frequency searching signal through the first antenna 142a provided on the door of the driver seat side, then transmit the low-frequency searching signal through the second antenna 142b provided on the door of the (front) passenger seat side, and then transmit the low-frequency searching through the third antenna 142c provided on the tailgate.

The vehicle may determine whether the user approaches the driver seat side, the passenger seat side, or the tailgate side based on a reception time at which a high-frequency response signal is received after transmitting the-low frequency searching signal.

For example, the vehicle may determine that the user, that is, the remote controller, approaches near the driver seat side in response to the high-frequency response signal being received after transmitting the low-frequency searching signal through the first antenna 142a provided on the door of the driver seat side, determine that the remote controller approaches near the (front) passenger seat side in response to the high-frequency response signal being received after transmitting the low-frequency searching signal through the second antenna 142b provided on the door of the (front) passenger seat side, and determine that the remote controller approaches near the tailgate side in response to the high-frequency response signal being received after transmitting the low-frequency searching signal through the third antenna 142c provided on the tailgate side.

Furthermore, in response to that the high-frequency response signal transmitted from the remote controller 2 is received through the second communication module 142, the vehicle may obtain the distance information with the remote controller 2 based on the received high-frequency response signal, obtain the position information of the antenna based on the received identification information of the antenna from which the response signal is received, obtain the direction information of the remote controller 2 based on the obtained position information of the antenna, and determine whether the location of the remote controller is near the door of the driver seat side based on the direction information of the remote controller.

In response to the signal being received by the second communication module 142, the vehicle obtains the distance information with the remote controller based on the received signal strength in the received signal, maintains the power-off of the facial recognition processor in response to determining that the distance with the remote controller exceeds the first reference distance D1 based on the obtained distance information with the remote controller 2 and the reference distance information, and controls the booting of the facial recognition processor in response to determining that the distance with the remote controller 2 is less than or equal to the first reference distance D1. At this time, the authentication processor of the vehicle may transmit the booting instruction to the facial recognition processor through the third communication module (in operation 201). The facial recognition processor performs the wake-up mode in response to reception of the booting instruction (in operation 202).

In a state in which the booting of the facial recognition processor 131b and the camera 120 is completed, the vehicle may obtain the distance information with the user who possesses the terminal 3 or the remote controller 2 based on the received signal strength of the signal received from one or both of the first and second communication modules 141 and 142, and determine whether the distance with the user is less than or equal to the second reference distance based on the obtained distance information with the user and reference distance information. The vehicle may maintain the wake-up mode of the facial recognition processor 131b and the camera 120 in response to determining that the distance with the user exceeds the second reference distance, and transmit the facial recognition instruction to the facial recognition processor 131b in response to determining that the distance with the user is less than or equal to the second reference distance (in operation 203).

At this time, the facial recognition processor performs the facial recognition mode (in operation 204). The facial recognition processor recognizes the face image based on the image information obtained through the camera, recognizes the face information that is a feature in the recognized face image, and transmits the recognized face information to the authentication processor 131a.

The authentication processor 131a performs the user authentication in response to the face information being received from the facial recognition processor 131b (in operation 205). At this time, the authentication processor 131a may determine whether the user who approaches the vehicle is the pre-registered user based on the received face information and the face information stored in the storage, transmit the user authentication success information to the body processor 132 in response to determining that the user who approaches the vehicle is the pre-registered user, and transmits the user authentication failure information to the body processor 132 in response to determining that the user who approaches the vehicle is not the pre-registered user.

The authentication processor 131a may determine whether a plurality of users exist within the image information obtained by the camera 120 based on the received face information. In other words, the authentication processor 131a may determine whether a plurality of users exists near the door of the driver seat side, transmit the user authentication failure information to the body processor in response to determining that the plurality of users exists. Herein, the plurality of users may include the pre-registered users and may further include other users.

The authentication processor 131a may identify an elapsed wake-up time of the facial recognition processor 131b, and transmit the power-off instruction to the facial recognition processor in response to that the recognized face information is not received until the identified wake-up time elapses a predetermined time.

In response to the touch signal being received through the manipulation member in a state in which the user authentication success information is received, the body processor 132 controls the unlocking of the door (in operation 206), and in response to the touch signal being received through the manipulation member in a state in which the user authentication failure information is received, the body processor 132 outputs the alarm (in operation 207).

The body processor 132 attempts the communication connection with the remote controller or the terminal in a state which the user authentication failure information is received, and if the communication connection with the remote controller or the terminal is available determines whether the touch signal is received or not and may control the unlocking of the door in response to that the touch signal is received.

The vehicle determines whether the ignition of the vehicle is in the off-state, and if the ignition of the vehicle is in the off-state may determine whether the user gets out of the vehicle based on the door opening/closing signal of the door open/close detector (not shown) or the occupant detection signal of the occupant detector (not shown).

In response to that the door closing signal is received in a state in which the user gets off, the vehicle determines whether the touch signal is received from the manipulation member, and in response to determining that the touch signal is received, the vehicle performs the facial recognition mode.

In other words, in response to the reception information of the touch signal being received from the body processor, the authentication processor may transmit the facial recognition instruction to the facial recognition processor (in operation 208). The facial recognition processor 131b performs the facial recognition mode in response to reception of the facial recognition instruction (in operation 209). The authentication processor may receive the image information obtained through the camera and perform the facial recognition based on the received image information.

In response to the face information being received from the facial recognition processor 131b, the authentication processor 131a performs the user authentication (in operation 210). At this time, the authentication processor 131a determines whether the user who approaches the vehicle is the pre-registered user based on the received face information and the face information stored in the storage. The authentication processor 131a may transmit the user authentication success information to the body processor 132 in response to determining that the user who approaches the vehicle is the pre-registered user, and transmit the user authentication failure information to the body processor 132 in response to determining that the user who approaches the vehicle is not the pre-registered user.

The body processor 132 controls the locking operation of the door 211 in response to the touch signal being received through the manipulation member in a state in which the user authentication success information is received (in operation 211), and maintains the unlocking of the door in response to the touch signal being received through the manipulation member in a state in which the user authentication failure information is received (in operation 212).

The body processor 132 attempts the communication connection with the remote controller or the terminal in a state in which the user authentication failure information is received, and if the communication connection with the remote controller or the terminal is available, determines whether the touch signal is received and may control the locking of the door in response to that the touch signal is received.

The vehicle obtains the distance information with the user based on the signals received by the first and second communication modules, determines whether the distance with the user exceeds the first reference distance based on the obtained distance information and the pre-stored reference distance information, and transmits the power-off instruction to the facial recognition processor and the camera in response to determining that the distance with the user exceeds the first reference distance (in operation 213).

The facial recognition processor and the camera switch to the sleep mode in response to reception of the power-off instruction (in operation 214).

The authentication device identifies whether the facial recognition processor is switched to the sleep mode, and identifies again whether the facial recognition processor is switched to the sleep mode in response to determining that the facial recognition processor is not switched to the sleep mode.

The authentication device may determine whether to switch the sleep mode of the facial recognition processor for a predetermined number of times.

The authentication device may control output of failure information in response to determining that the facial recognition processor is not switched to the sleep mode.

As is apparent from the above, embodiments of the disclosure may shorten a time from when the user arrives at a vehicle to when the facial recognition completion by determining primarily a situation in which the user approaches the vehicle to attempt the booting of the facial recognition processor, and determining secondarily a situation in which the user approaches the vehicle after the booting of the facial recognition processor is completed to perform the facial recognition.

Further, the embodiments of the disclosure cuts off the power supplied to the facial recognition processor after the ignition of vehicle is turned off, and supplies the power to the facial recognition processor in a situation in which the user approaches the vehicle, thereby reducing the amount of power consumed by the facial recognition processor. In other words, according to the embodiments of the disclosure, leakage current may be reduced in a state in which the ignition of vehicle is turned off, thus leading to decreased wasteful energy consumption.

Further, the embodiments of the disclosure may perform the unlocking operation of the door within a short time in response to the door handle operation by transmitting the result of authentication to the body processor after the facial recognition, thereby performing user seamless locking/unlocking operations.

Further, the embodiments of the disclosure may increase security against vehicle theft and prevent vehicle theft by others by controlling the output of alarm information when the user authentication fails after the facial recognition.

Further, the embodiments of the disclosure may open the door by manipulating the door handle after the alarm information is output or by unlocking the door by a remote controller (e.g., digital key, smart key), and control the engine of the vehicle to be started. Accordingly, user convenience, reliability and accuracy of the user authentication may be improved.

Further, the embodiments of the disclosure may prevent the cost of adding and manufacturing hardware due to only requiring a change in software without changing hardware for the user authentication.

Further, the embodiments of the disclosure may improve the quality and marketability of the vehicle by enhancing security, further improves user convenience and vehicle safety, and secures competitiveness of the product.

Embodiments of the disclosure may be implemented in the form of a recording medium storing instructions executable by a computer. Instructions may be stored in the form of program code, and when executed by a processor, may generate program modules to perform operations of the disclosed embodiments. The recording medium may be implemented as a computer-readable recording medium.

The computer-readable recording medium includes all kinds of recording media in which instructions which can be decoded by a computer are stored, for example, a read only memory (ROM), a random-access memory (RAM), a magnetic tape, a magnetic disk, a flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

What is claimed is:

1. An authentication device, comprising:
   a facial recognition processor configured to recognize a face from image information obtained by a camera;
   a communication module configured to communicate with an external device; and
   an authentication processor configured to:
   obtain a distance with the external device based on a received signal strength of a signal received by the communication module;
   determine whether the distance with the external device is less than or equal to a first reference distance based on the obtained distance;
   transmit a booting instruction to the facial recognition processor in response to determining the distance with the external device is less than or equal to the first reference distance;
   transmit a power-off instruction to the facial recognition processor in response to determining the distance with the external device exceeds the first reference distance;
   determine whether the facial recognition processor is switched to a sleep mode after transmitting the power-off instruction to the facial recognition processor; and
   control output of failure information in response to determining that the facial recognition processor is not switched to the sleep mode;
   transmit a facial recognition instruction to the facial recognition processor based on the obtained distance after the booting of the facial recognition processor is completed; and
   perform a user authentication based on face information transmitted from the facial recognition processor.

2. The authentication device of claim 1, wherein the facial recognition processor is configured to perform a wake-up mode in response to reception of the booting instruction, and perform a sleep mode in response to reception of the power-off instruction.

3. The authentication device of claim 1, wherein the authentication processor is further configured to:
   transmit the facial recognition instruction to the facial recognition processor in response to determining the distance with the external device being less than or equal to a second reference distance based on the obtained distance after the booting of the facial recognition processor is completed; and
   control the facial recognition processor to a wake-up mode in response to determining that the distance with the external device exceeds the second reference distance.

4. The authentication device of claim 1, wherein the communication module is configured to perform at least one of Bluetooth communication (BLU), ultra-wideband communication (UWB), Near Field Communication (NFC), low-frequency communication, and high-frequency communication.

5. The authentication device of claim 1, further comprising a body processor, wherein:
   the authentication processor is further configured to transmit authentication success information or authentication failure information for the user authentication to the body processor; and
   the body processor is configured to control locking and unlocking of a door of the vehicle based on the authentication success information or the authentication failure information.

6. The authentication device of claim 1, wherein the authentication processor is further configured to:
   determine whether a predetermined time has elapsed from a time when the facial recognition processor wakes up, and transmit a power-off instruction to the facial recognition processor if the face information is not received from the facial recognition processor after the predetermined time has elapsed.

7. A vehicle, comprising:
a door including a handle;
a locking member configured to lock and unlock the door of the vehicle;
a manipulation member provided on the handle of the door;
a camera configured to obtain an image;
a communicator configured to communicate with an external device;
at least one of a display or a sound outputter; and
a controller comprising:
a facial recognition processor configured to recognize a face based on image information obtained by the camera, and an authentication processor configured to perform a user authentication based on face information recognized by the facial recognition processor,
wherein the controller is configured to:
obtain a distance with the external device based on a received signal strength of a signal received by the communicator;
determine whether the distance with the external device is less than or equal to a first reference distance based on the obtained distance;
transmit a booting instruction to the facial recognition processor in response to determining the distance with the external device is less than or equal to the first reference distance;
transmit a power-off instruction to the facial recognition processor in response to determining the distance with the external device exceeds the first reference distance;
determine whether the facial recognition processor is switched to a sleep mode after transmitting the power-off instruction to the facial recognition processor; and
control output of failure information in response to determining that the facial recognition processor is not switched to the sleep mode;
transmit a facial recognition instruction to the facial recognition processor based on the obtained distance after the booting of the facial recognition processor is completed, and
control operation of the locking member based on user authentication information of the authentication processor and a manipulation signal of the manipulation member.

8. The vehicle of claim 7,
wherein the facial recognition processor is configured to perform a wake-up mode in response to reception of the booting instruction, and perform a sleep mode in response to reception of the power-off instruction.

9. The vehicle of claim 7, wherein the controller is further configured to:
transmit the facial recognition instruction to the facial recognition processor in response to determining that the distance with the external device is less than or equal to a second reference distance based on the obtained distance after the booting of the facial recognition processor is completed; and
control the facial recognition processor to a wake-up mode in response to determining that the distance with the external device exceeds the second reference distance.

10. The vehicle of claim 7, wherein:
the external device further comprises a terminal; and
the communicator further comprises a first communication module configured to communicate with the terminal,
wherein the first communication module is configured to perform at least one of Bluetooth communication (BLU), ultra-wideband communication (UWB), Near Field Communication (NFC), low-frequency communication, and high-frequency communication.

11. The vehicle of claim 7, wherein:
the external device further comprises a remote controller; and
the communicator further comprises a second communication module configured to communicate with the remote controller, and a plurality of antennas.

12. The vehicle of claim 7, wherein:
the external device further comprises at least one of a remote controller and a terminal; and
the communicator is configured to perform at least one of BLU, UWB, NFC, low-frequency communication, and high-frequency communication.

13. The vehicle of claim 7, wherein the controller further comprises a body processor configured to control the locking member, and
the authentication processor is configured to transmit authentication success information or authentication failure information for the user authentication to the body processor,
the body processor is configured to control unlocking of the door in response to a manipulation signal being received from the manipulation member in a state in which the authentication success information is received, control communication with the external device in response to the authentication failure information being received, and control unlocking of the door based on whether a communication connection with the external device exists.

14. The vehicle of claim 13, wherein the authentication processor, the facial recognition processor and the body processor are configured to perform controller area network (CAN) communication with each other.

15. The vehicle of claim 7, wherein the authentication processor is configured to:
determine whether a predetermined time has elapsed from a time when the facial recognition processor wakes up, and transmit a power-off instruction to the facial recognition processor if the face information is not received from the facial recognition processor after the predetermined time has elapsed.

16. The vehicle of claim 7, wherein the authentication processor is configured to identify the number of users based on the received face information, and determine that authentication fails in response to the number of identified users being plural.

* * * * *